US012150457B2

(12) United States Patent
Zou et al.

(10) Patent No.: US 12,150,457 B2
(45) Date of Patent: Nov. 26, 2024

(54) THREE-LAYER FRUIT OR VEGETABLE PRESERVATIVE FILM WITH TEMPERATURE-CONTROLLED RELEASE UNDER MECHANICAL DRIVING POWER, AND PREPARATION METHOD THEREOF

(71) Applicant: Jiangsu University, Jiangsu (CN)

(72) Inventors: Xiaobo Zou, Jiangsu (CN); Junjun Zhang, Jiangsu (CN); Jiyong Shi, Jiangsu (CN); Jianing Zhang, Jiangsu (CN); Xiaowei Huang, Jiangsu (CN); Li Liu, Jiangsu (CN); Xuetao Hu, Jiangsu (CN); Xiaodong Zhai, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 18/021,552

(22) PCT Filed: Feb. 23, 2022

(86) PCT No.: PCT/CN2022/077358
§ 371 (c)(1),
(2) Date: Feb. 15, 2023

(87) PCT Pub. No.: WO2023/155217
PCT Pub. Date: Aug. 24, 2023

(65) Prior Publication Data
US 2024/0260596 A1 Aug. 8, 2024

(30) Foreign Application Priority Data
Feb. 16, 2022 (CN) .......................... 202210141241.2

(51) Int. Cl.
A23B 7/16 (2006.01)
A23B 7/155 (2006.01)
(Continued)

(52) U.S. Cl.
CPC ................ *A23B 7/16* (2013.01); *A23B 7/155* (2013.01); *A23L 3/34635* (2013.01); *A23L 3/3544* (2013.01)

(58) Field of Classification Search
CPC ....................................................... A23B 7/155
See application file for complete search history.

(56) References Cited

U.S. PATENT DOCUMENTS
2020/0171804 A1 6/2020 Liao et al.

FOREIGN PATENT DOCUMENTS
CN 107813569 3/2018
CN 110511443 11/2019
(Continued)

OTHER PUBLICATIONS
Guo et al. (CN 103205081) Machine abstract (Year: 2013).*
(Continued)

*Primary Examiner* — Felicia C Turner
(74) *Attorney, Agent, or Firm* — JCIPRNET

(57) ABSTRACT

In the present disclosure, a temperature-sensitive inner layer solution, a deformation intermediate layer solution, and a rigid outer layer solution are first prepared and spray-coated layer by layer on a surface of a fruit or vegetable, such that three preservative film layers are produced successively and can be used for the preservation of the fruit or vegetable.

8 Claims, 3 Drawing Sheets

(51) Int. Cl.
*A23L 3/3463* (2006.01)
*A23L 3/3544* (2006.01)

(56) References Cited

FOREIGN PATENT DOCUMENTS

| | | | |
|---|---|---|---|
| CN | 110724295 | 1/2020 | |
| CN | 111941974 | 11/2020 | |
| CN | 113717415 | 11/2021 | |
| WO | WO-9946329 A1 * | 9/1999 | ............. A01N 25/26 |

OTHER PUBLICATIONS

"Written Opinion of the International Searching Authority (Form PCT/ISA/237) of PCT/ CN2022/077358," mailed on Jan. 1, 2023, pp. 1-5.

* cited by examiner

THREE-LAYER FRUIT OR VEGETABLE PRESERVATIVE FILM WITH TEMPERATURE-CONTROLLED RELEASE UNDER MECHANICAL DRIVING POWER, AND PREPARATION METHOD THEREOF

CROSS-REFERENCE TO RELATED APPLICATION

This application is a 371 of international application of PCT application serial no. PCT/CN2022/077358, filed on Feb. 23, 2022, which claims the priority benefit of China application no. 202210141241.2, filed on Feb. 16, 2022. The entirety of each of the above-mentioned patent applications is hereby incorporated by reference herein and made a part of this specification.

TECHNICAL FIELD

The present disclosure belongs to the technical field of smart controlled-release antimicrobial packaging (AP), and specifically relates to an antimicrobial three-layer film with temperature-controlled release under a mechanical driving power, and a preparation method thereof.

RELATED ART

At present, the coating of an active ingredient such as a natural extract, chitosan, and a metal nanoparticle on a surface or the direct addition of a renewable substance (such as a polysaccharide, a polypeptide, and a lipid) or a polymer material (such as polylactic acid (PLA) and polyhydroxyalkanoate (PHA)) is one of the major advances in active packaging technology. A release law of an active ingredient in an AP film can be verified from the perspective of mutual antagonism of power and resistance. Generally, a concentration difference of an active ingredient can provide a mass transfer power for the release of the active ingredient, and the physical and chemical properties of a polymer substrate can provide a path resistance. In common AP, a polymer exhibits a small path resistance for the release of the antimicrobial agent, and thus a mass transfer power dominates, such that the antimicrobial active ingredient can be released from the surface of a polymer to the inside of a packaging system in the form of diffusion and effectively kill microorganisms on the surface of food, thereby finally achieving a bactericidal effect. However, a release law of such traditional AP is inconsistent with the preservation needs of food and easily causes bacteria to develop drug resistance. Therefore, new requirements have been put forward for food AP with on-demand release. In view of this, controlled-release AP systems have become a research hotspot in recent years. In controlled-release packaging (CRP), a polymer substrate usually exhibits a strong resistance for a release path of an antimicrobial agent such that the antimicrobial agent is not released at an early stage; and when stimulated, the polymer substrate undergoes a conformational or structural change, which directly reduces a path resistance for the release of the antimicrobial agent such that the antimicrobial agent can be released to an inside of a packaging system according to a kinetic law of diffusion release.

Different stimulation signals match different polymers, among which a temperature-sensitive polymer can be used for an antimicrobial food preservative film with temperature-controlled release. Chinese patent CN110724295A discloses a temperature-sensitive polyurethane (TSPU) antioxidant composite film with gas phase-controlled release, where a temperature is controlled to change a size of a free-volume hole and reduce a resistance for the release of an antimicrobial agent, such that the release amounts of the antimicrobial agent at different temperatures can be finally controlled. Another literature also discloses a temperature-responsive polymer (N-isopropylacrylamide, NIPAM) material, where a macromolecular side chain includes both hydrophilic amido and hydrophobic isopropyl with a unique response mechanism to temperature as follows: When a temperature is lower than lower critical solution temperature (LCST), a polymer chain is in an extended state, and a large number of water molecules are gathered around the polymer chain to form a thick hydration shell, which causes the polymer to directly increase a path resistance for the release of the antimicrobial active ingredient. When a temperature is higher than LCST, the hydrophobic isopropyl in the polymer structure is dehydrated, and the dehydration triggers a hydrophobic interaction between hydrophobic groups, such that a polymer chain curls and shrinks significantly and a surrounding hydration layer is also destroyed, which reduces the hindrance of the polymer for active molecules and directly opens a release path channel for an antimicrobial agent (it is macroscopically manifested as the controlled release of the active ingredient from a surface of the polymer). The above technologies provide a basis for the development of a temperature-controlled release packaging film, but the temperature-sensitive AP disclosed currently relies on a temperature stimulation to change a conformation of a polymer. Although the change after the stimulation can reduce a resistance for the release path of the antimicrobial agent, the mass transfer power for the release of the antimicrobial agent is still provided by a concentration difference and the direction of the released active ingredient is uncontrollable. Therefore, this smart CRP faces the following two problems: 1. After a controlled-release action, a diffusion direction for the release of the antimicrobial agent is still uncontrollable (which is manifested as the unordered diffusion in a packaging environment), such that a part of the antimicrobial active ingredient cannot diffuse to a surface of food, resulting in a waste of the antimicrobial agent. 2. A mass transfer power for the release of the antimicrobial agent only depends on a concentration difference, and the power is small and will gradually decrease with the increase of release time, which will eventually cause problems such as a poor preservation effect with the untimely diffusion of the antimicrobial agent to a surface of food.

Based on this, the present disclosure provides a controlled-release mechanism of a three-layer fruit and vegetable preservative film, which is specifically assembled by a temperature-sensitive inner layer, a deformation intermediate layer, and a mechanical outer layer. The three-layer film can effectively control the direction and improve a mass power for the release path of the antimicrobial active ingredient, thereby optimizing a preservation effect. The compatibility of the three-layer film is significantly improved through the layer-by-layer (LBL) assembly technology in combination with a hydrogen bond interaction between hydrogel layers. No research has been conducted in the prior art to develop a method for providing a path direction and power for the release of the antimicrobial active ingredient. In addition, the present disclosure overcomes the response insensitive of the smart film problem that an ambient temperature cannot quickly respond to a temperature particle layer of an inner layer due to the film thickness of a three-layer film.

SUMMARY OF INVENTION

In view of the technical problem that, in the existing CRP, after the release of an antimicrobial active ingredient is stimulated, a power for a release path of the antimicrobial active ingredient is insufficient and a diffusion direction of the antimicrobial active ingredient is uncontrollable, the present disclosure provides a preparation method of an antimicrobial three-layer film with temperature-controlled release under a mechanical driving power. The antimicrobial three-layer film with temperature-controlled release under a mechanical driving power is specifically assembled by an inner layer, an intermediate layer, and an outer layer. The inner layer is a temperature-sensitive layer and can change the resistance of a polymer for a release path of the antimicrobial active ingredient at different temperatures, which is macroscopically manifested as a release switch for the antimicrobial active ingredient. The intermediate layer is a deformation layer with an expansion and contraction property, which will expand with the rise of temperature and directly produce an extrusion stress on the inner and outer layers. The outer layer is a rigid layer (mechanical outer layer) with excellent mechanical properties, which can not only serve as a barrier layer for the three-layer film, but also provide a centripetal driving force for the release of the active ingredient in the inner layer. In conclusion, the three-layer film can effectively control the direction and improve a power for the release path of the antimicrobial active ingredient, thereby optimizing a preservation effect.

The present disclosure adopts the following technical solutions to achieve the above technical objective. The preparation method specifically includes the following steps.

Step I: Preparation of a Temperature-Sensitive Inner Layer Solution

S1. Dissolving chitosan in an acetic acid solution, adding a N-isopropylacrylamide monomer, and thoroughly stirring; adjusting a temperature of a resulting solution to a specified value, adding a solution of ceric ammonium nitrate as an initiator, then introducing nitrogen for protection, and conducting a reaction for a specified period of time; then adding an organic solvent to a mixed solution obtained after the reaction for precipitation to obtain a crude product, conducting extraction to obtain a fine product, and drying the fine product to obtain a final product, which is a chitosan N-isopropylacrylamide temperature-sensitive particle.

Further, in the S1, the chitosan, the N-isopropylacrylamide monomer, the ceric ammonium nitrate, and the acetic acid solution are in a ratio of (5-10) g:(5-2) g:1 g:(20-50) mL; the acetic acid solution has a volume concentration of 2% to 5%; the temperature is adjusted to 40° C. to 50° C.; and the reaction is conducted for 24 h to 48 h.

Further, in the S1, the organic solvent is any one selected from, or a composite solution of any two or more at any ratio selected from the group consisting of acetone, dichloromethane, trichloromethane, N,N-dimethylacetamide, ethyl acetate, and dihydrofuran; the mixed solution and the organic solvent are in a volume ratio of 1:(5-15); and the drying is conducted at 25° C. to 40° C.

S2. Dissolving an essential oil in an ethanol solution to obtain a mixed solution A; dissolving the temperature-sensitive particle prepared in the S1 in distilled water to prepare a temperature-sensitive particle dispersion with a specified mass concentration; and adding the mixed solution A to the temperature-sensitive particle dispersion to obtain a mixed solution B, conducting a reaction at a specified temperature, and subjecting the mixed solution B to dialysis with distilled water to remove uncoated free essential oil to obtain the temperature-sensitive inner layer solution loaded with an active ingredient.

Further, in the S2, the essential oil is any one selected from the group consisting of oregano essential oil, cinnamon essential oil, *Eucalyptus* essential oil, clove essential oil, and thyme essential oil; the ethanol solution has a volume concentration of 50%; and a mass concentration of the essential oil in the mixed solution A is 1.5% to 3%.

Further, in the S2, the temperature-sensitive particle dispersion has a mass concentration of 1 g/mL to 3 g/mL; the mixed solution A is added to the temperature-sensitive particle dispersion in a volume ratio of 1:(5-10); the reaction is conducted at 18° C. to 25° C. for 6 h to 8 h; and the dialysis is conducted for 6 h to 18 h.

Step II: Preparation of a Deformation Intermediate Layer Solution

Dissolving gelatin and sodium alginate in distilled water, thoroughly stirring at a specified temperature, and adding nano-zinc oxide (ZnONPs) and glycerol to obtain a hydrogel composite solution, which is the deformation intermediate layer solution.

Further, in the step II, the gelatin, the sodium alginate, and the distilled water are in a ratio of (1-2) g:(2-4) g:100 mL; the stirring is conducted at 40° C. to 60° C.; a mass concentration of the nano-zinc oxide in the hydrogel composite solution is 0.01% to 0.03%; and a volume concentration of the glycerol in the hydrogel composite solution is 1% to 2%.

Step III: Preparation of a Rigid Outer Layer Solution

Dissolving polyvinyl alcohol and agar in distilled water, heating and stirring to a specified temperature; and adding nano-titanium dioxide ($TiO_2$) and glycerol, and thoroughly stirring to obtain a composite solution, which is the rigid outer layer solution.

Further, in the step III, the polyvinyl alcohol, the agar, and the distilled water are in a ratio of (2-4) g:(0.5-2) g: 100 mL; the heating is conducted to 90° ° C. to 100° C., and the stirring is conducted for 1 h to 2 h; a mass concentration of the nano-titanium dioxide in the composite solution is 0.01% to 0.05%; and a volume concentration of the glycerol in the composite solution is 1% to 4%.

Step IV: Coating on a Surface of a Fruit or Vegetable Through LBL Assembly

Spray-coating the temperature-sensitive inner layer solution, the deformation intermediate layer solution, and the rigid outer layer solution on the surface of the fruit or vegetable through the LBL assembly, such that three preservative film layers are successively produced to obtain the three-layer fruit or vegetable preservative film with temperature-controlled release under a mechanical driving power.

Further, in the step IV, the fruit or vegetable is specifically a spherical fruit or vegetable, including apple, citrus, peach, cherry tomato, tomato, round pear, or round eggplant.

The chitosan at an end of a temperature-sensitive particle chain in the temperature-sensitive layer solution is a polycation, and amino in its structure is easily protonated into $-NH_3^+$, which is positively charged in the solution. The sodium alginate in the deformation intermediate layer is a polyanion, and carboxyl (—COOH) in its structure leads to a large amount of —COO⁻, which is negatively charged in the solution. Therefore, the temperature-sensitive inner layer and the intermediate layer are connected through LBL assembly based on an electrostatic interaction between positive and negative charges. A large number of hydrogen bonds are present between the gelatin and sodium alginate hydrogel in the deformation intermediate layer and the agar in the rigid outer layer, and the hydrogen bonds can improve a binding force between the two layers.

The nano-zinc oxide in the deformation intermediate layer has a high thermal conductivity coefficient and exhibit excellent thermal stability and antibacterial properties; and $TiO_2$ in the rigid outer layer has a high thermal conductivity coefficient and can resist ultraviolet (UV) rays to some extent.

By adopting the above technical solutions, the present disclosure has the following beneficial effects.

(1) The chitosan N-isopropylacrylamide temperature-sensitive particle in the inner layer of the film in the present disclosure has an LCST close to the human body temperature. The temperature-sensitive inner layer can respond to a temperature change, to change a conformation of the polymer and reduce a resistance of the polymer for a release path of the essential oil, which can effectively avoid the rapid growth of microorganisms caused by an abnormal ambient temperature change during a process from storage to sale of fruit or vegetables.

(2) The intermediate hydrogel layer of the present disclosure is an expansion layer, which can produce an extrusion stress in response to an ambient temperature change and act on both the rigid outer layer and the temperature-sensitive inner layer. The rigid outer layer for spherical fruit or vegetables has strong mechanical properties and will resist the extrusion stress caused by the expansion layer, and thus a deformation force will be totally applied to the temperature-sensitive inner layer, which is finally manifested as a centripetal force. The centripetal force can directly increase a mass power for a release path of the essential oil of the temperature-sensitive particle and effectively accelerate the release of the essential oil. Moreover, the centripetal force can effectively control a direction of the release path of the antimicrobial active ingredient to promote the effective release rate to a surface of a fruit or vegetable rather than the release based on random outward diffusion. Therefore, the present disclosure can effectively improve a mass power for the release path of the antimicrobial active ingredient on the basis of controlling a direction of the release path of the antimicrobial active ingredient, thereby optimizing a preservation effect.

(3) The nano-titanium dioxide particle in the outer layer and the nano-zinc oxide particle in the intermediate layer both have excellent thermal conductivity coefficients, and can avoid the untimely response to temperature caused by the thickness of a multi-layer film, such that an ambient temperature change is rapidly transferred to the inner layer, which can promote the rapid response of temperature to the temperature-sensitive inner layer and timely dealing with the accelerated spoilage of fruits and vegetables caused by an external ambient temperature change. In addition, $TiO_2$ also has excellent UV resistance, which can improve the photostability of the three-layer film, thereby protecting the stability of the active ingredient. The nano-zinc oxide in the intermediate layer also has antibacterial activity, which can directly sterilize the surface of a fruit or vegetable initially without an external temperature stimulation, thereby further reducing the infection hazard of microorganisms on the fruit or vegetable and prolonging a storage period of the fruit or vegetable itself.

(4) In the present disclosure, a three-layer film is prepared by an LBL assembly film-forming method, where an adsorption force between the inner layer and the intermediate layer of the film is effectively improved through an electrostatic interaction between a polyelectrolyte cation in the inner layer and an anion in the intermediate layer; and a bonding force between the intermediate layer and the outer layer of the film is effectively improved through a hydrogen bonding force between the hydrogel polymer in the intermediate layer and the outer layer.

DESCRIPTION OF EMBODIMENTS

Figure 1:
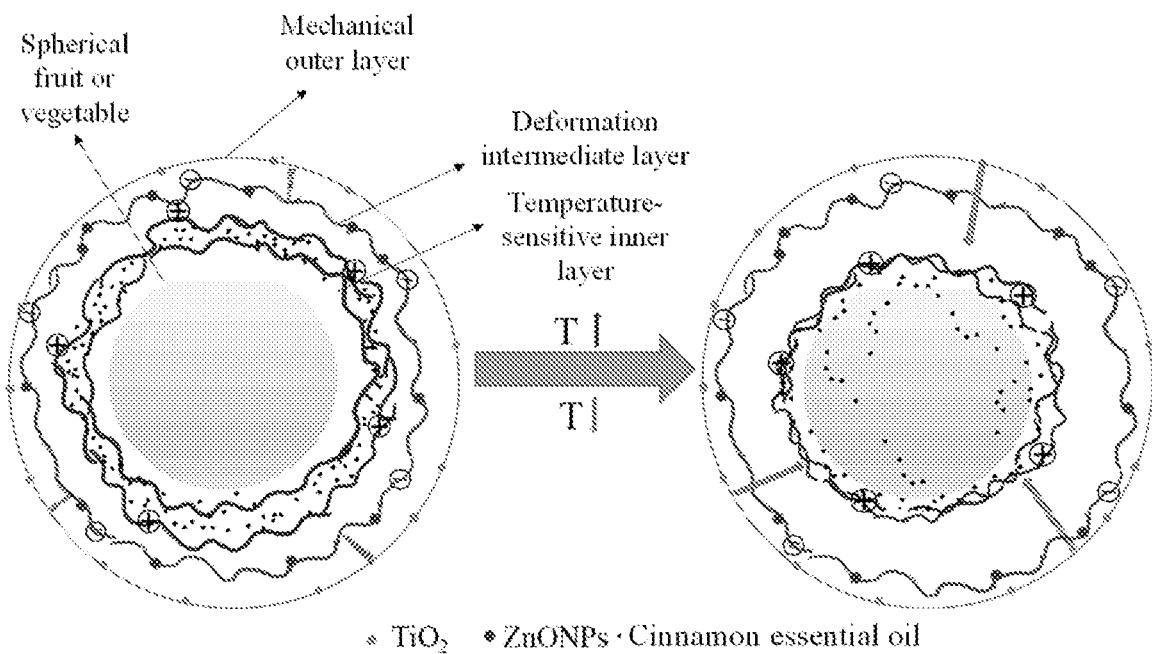
FIG. 1 is a schematic diagram of the controlled-release three-layer fruit or vegetable preservative film prepared in the present disclosure.

In order to make the objectives, technical solutions, and advantages of the present disclosure more comprehensible, the present disclosure is described in further detail below with reference to specific examples and accompanying drawings.

Example 1

A preparation method of an antimicrobial three-layer film with temperature-controlled release under a mechanical driving power is provided, and the antimicrobial three-layer film is specifically assembled by an inner layer, an intermediate layer, and an outer layer. The inner layer is a temperature-sensitive layer and can change the resistance of a polymer for the release path of the antimicrobial active ingredient at different temperatures, which is macroscopically manifested as a release switch for the antimicrobial active ingredient. The intermediate layer is a deformation layer with the expansion and contraction property, which will expand with the rise of a temperature and directly produce an extrusion stress on the inner and outer layers. The outer layer is a rigid layer (mechanical outer layer) with excellent mechanical properties, which can not only serve as a barrier layer for the three-layer film, but also provide a centripetal driving force for the release of the active ingredient in the inner layer. In conclusion, the three-layer film can effectively control the direction and improve a power for the release path of the antimicrobial active ingredient, thereby optimizing a preservation effect. The preparation method includes the following steps.

Step I: Preparation of a Temperature-Sensitive Inner Layer Solution

S1. 1 g of chitosan was dissolved in 20 mL of an acetic acid solution with a volume concentration of 2%, then 1 g of a N-isopropylacrylamide monomer was added, and a resulting mixture was thoroughly stirred for thorough dissolution; a temperature of the resulting solution was adjusted to 40° C., 0.2 g of a solution of ceric ammonium nitrate was added as an initiator, then nitrogen was immediately introduced for protection, and a reaction was conducted for 24 h; and acetone was added for precipitation to obtain a crude product, extraction was further conducted with 100 mL of methanol to obtain a fine product, and the fine product was finally dried in a vacuum drying oven at 25° C. to remove the residual organic solution to obtain a chitosan N-isopropylacrylamide temperature-sensitive particle.

S2. 3 g of cinnamon essential oil was completely dissolved in 20 mL of the ethanol solution with a volume concentration of 50% to obtain a mixed solution A for later use; 1 g of the temperature-sensitive particle prepared of S1 was completely dissolved in 100 mL of distilled water to obtain a temperature-sensitive particle dispersion; and then the mixed solution A was added to the temperature-sensitive particle dispersion, an adsorption reaction was fully conducted at 18° C. for 6 h, and a resulting reaction system was subjected to dialysis with distilled water for 6 h to remove the uncoated free cinnamon essential oil to obtain the temperature-sensitive inner layer solution loaded with an active ingredient.

Figure 2:
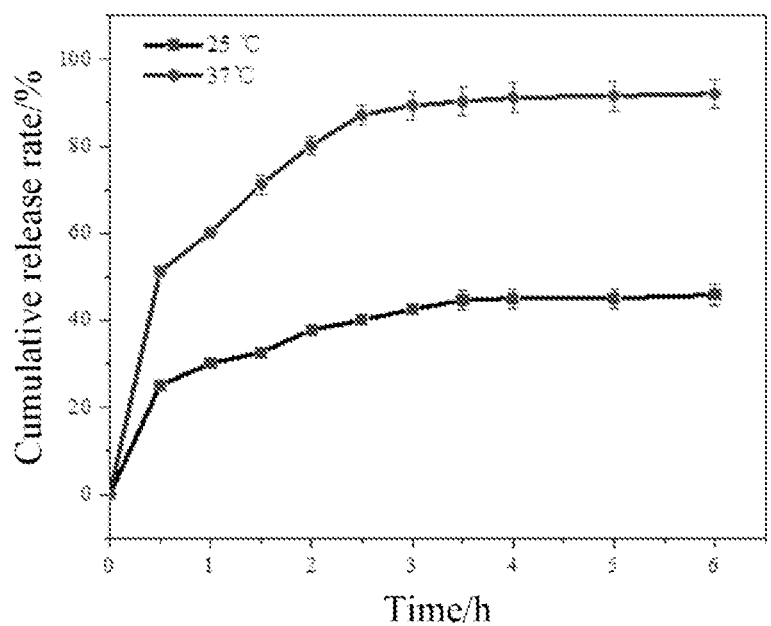
FIG. 2 shows release rates of the temperature-sensitive particle in the inner layer in Example 1 of the present disclosure at 25° C. and 37° C., respectively.

In order to further characterize the temperature sensitivity of the temperature-sensitive inner layer solution, an inner layer film was formed by a casting and drying method. The essential oil release rate of the inner layer in a 0.1 M PBS buffer was tested at 25° C. and 37° C. by a shaker method, and a cumulative release rate was further calculated by testing an essential oil concentration in a simulated solution. Results are shown in FIG. 2, and it can be known that a cumulative release rate of the temperature-sensitive inner layer solution at 37° C. was significantly higher than that at 25° C.

Step II: Preparation of a Deformation Intermediate Layer Solution 1 g of gelatin and 2 g of sodium alginate were dissolved and stirred in 100 mL of distilled water at 40° C., and nano-zinc oxide and glycerol were added to obtain a hydrogel composite solution, which was the deformation intermediate layer solution. A mass concentration of the nano-zinc oxide in the hydrogel composite solution was 0.01%, and a volume concentration of the glycerol in the hydrogel composite solution was 1%. The nano-zinc oxide had a high thermal conductivity coefficient and exhibited prominent thermal stability and antibacterial properties, and could quickly transfer the external ambient temperature change to the inner layer in time, such that the switch of the release path in the inner layer was opened in time to reduce a resistance for the release path and quickly release the active ingredient.

Step III: Preparation of a Rigid Outer Layer Solution 2 g of polyvinyl alcohol and 0.5 g of agar were dissolved and stirred in 100 mL of distilled water at 90° C. for 2 h; and titanium dioxide and glycerol were added, and a resulting mixture was thoroughly stirred to obtain a composite solution, which was the rigid outer layer solution. A mass concentration of the titanium dioxide in the composite solution was 0.01% and a volume concentration of the glycerol in the composite solution was 2%.

Step IV: Coating on a Surface of a Fruit or Vegetable Through LBL Assembly

The temperature-sensitive inner layer solution, the deformation intermediate layer solution, and the rigid outer layer solution were spray-coated on the surface of an orange through the LBL assembly, such that three preservative film layers were successively produced on the surface of the orange, including a temperature-sensitive inner layer, a deformation intermediate layer, and a rigid outer layer from inside to outside, which could be used for the preservation of the orange. The chitosan at the end of the temperature-sensitive particle in the temperature-sensitive layer solution is a polycation, and amino in its structure is easily protonated into $-NH_3^+$, which is positively charged in the solution. The sodium alginate in the deformation intermediate layer is a polyanion, and carboxyl (—COOH) in its structure leads to a large amount of —COO$^-$, which is negatively charged in the solution. Therefore, the temperature-sensitive inner layer and the intermediate layer are connected through LBL assembly based on an electrostatic interaction between positive and negative charges. A large number of hydration hydrogen bonds are present between the gelatin and sodium alginate hydrogel in the intermediate layer and the agar (gel) polyvinyl alcohol in the outer layer, and the hydrogen bonds can improve a binding force between the two layers, such that the three layers of the preservative film can be tightly combined with each other, thereby effectively exerting the specific functions of the three layers.

Example 2

A preparation method of an antimicrobial three-layer film with temperature-controlled release under a mechanical driving power is provided, and the antimicrobial three-layer film is specifically assembled by an inner layer, an intermediate layer, and an outer layer. The inner layer is a temperature-sensitive layer and can change the resistance of the polymer for a release path of the antimicrobial active ingredient at different temperatures, which is macroscopically manifested as a release switch for the antimicrobial active ingredient. The intermediate layer is a deformation layer with the expansion and contraction property, which will expand with the rise of a temperature and directly produce an extrusion stress on the inner and outer layers. The outer layer is a rigid layer (mechanical outer layer) with excellent mechanical properties, which can not only serve as a barrier layer for the three-layer film, but also provide a centripetal driving force for the release of the active ingredient in the inner layer. In conclusion, the three-layer film can effectively control the direction and improve a power for the release path of the antimicrobial active ingredient, thereby optimizing a preservation effect. The preparation method includes the following steps.

Step I: Preparation of a Temperature-Sensitive Inner Layer Solution

S1. 1.2 g of chitosan was dissolved in 20 mL of an acetic acid solution with a volume concentration of 3%, then 1 g of a N-isopropylacrylamide monomer was added, and a resulting mixture was thoroughly stirred for thorough dissolution; a temperature of a resulting solution was adjusted to 45° C., 0.2 g of a solution of ceric ammonium nitrate was added as an initiator, then nitrogen was immediately introduced for protection, and a reaction was conducted for 36 h; and dichloromethane was added for precipitation to obtain a crude product, extraction was further conducted with 200 mL of methanol to obtain a fine product, and the fine product was dried in a vacuum drying oven at 30° ° C. to remove the residual organic solution to obtain a chitosan N-isopropylacrylamide temperature-sensitive particle.

S2. 3 g of cinnamon essential oil was completely dissolved in 15 mL of an ethanol solution with a volume concentration of 50% to obtain an essential oil solution for later use; 2 g of the temperature-sensitive particle prepared in S1 was dissolved in 100 mL of distilled water to obtain a temperature-sensitive particle dispersion; and then the essential oil solution was added to the temperature-sensitive particle dispersion, an adsorption reaction was fully conducted at 20° C. for 7 h, and a resulting reaction system was subjected to dialysis with distilled water for 12 h to remove the uncoated free cinnamon essential oil to obtain the temperature-sensitive inner layer solution loaded with the active ingredient.

Step II: Preparation of a Deformation Intermediate Layer Solution 1.5 g of gelatin and 2.5 g of sodium alginate were dissolved and stirred in 100 mL of distilled water at 50° C., and nano-zinc oxide and glycerol were added to obtain a hydrogel composite solution for the intermediate layer. A mass concentration of the nano-zinc oxide in the hydrogel composite solution was 0.03%, and a volume concentration of the glycerol in the hydrogel composite solution was 1.5%. The nano-zinc oxide had a high thermal conductivity coefficient and exhibited prominent thermal stability and antibacterial properties, and could quickly transfer the external ambient temperature change to the inner layer in time, such that the switch of the release path in the inner layer was opened in time to reduce a resistance for the release path and quickly release the active ingredient.

Figure 3:
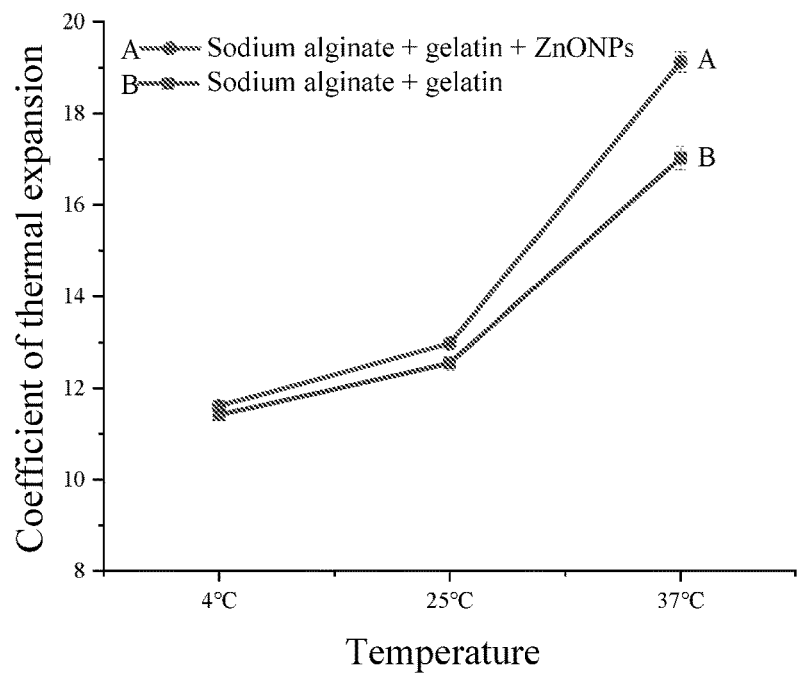
FIG. 3 shows coefficients of thermal expansion (CTEs) of the intermediate layer of the preservative film in example 2 of the present disclosure at different temperatures (A) and CTEs of the preservative film without nano-zinc oxide in the comparative example at different temperatures (B).

In order to further verify the expansion characteristic of the deformation intermediate layer, an intermediate layer film with the hydrogel composite solution was formed by the casting and drying method, and an expansion rate of the intermediate layer under a PBS buffer was tested at different temperatures. Moreover, in order to verify whether the addition of the nano-zinc oxide thermally-conductive particle affected the expansion characteristic of the intermediate layer, a deformation intermediate layer solution without nano-zinc oxide was also prepared in the present disclosure for film formation, and a specific operation step was consistent with step II, except that nano-zinc oxide was not added. Results are shown in FIG. 3, and it can be known that, regardless of whether zinc oxide was added to the intermediate layer, an expansion rate of the intermediate layer increases with the rise of temperature, and the experimental group with zinc oxide had a slightly higher CTE than the blank group, which was consistent with the high heat transfer coefficient characteristic of zinc oxide. Therefore, it can be proved that the intermediate deformation layer can expand with the rise of temperature.

Step III: Preparation of a Rigid Outer Layer Solution 3 g of polyvinyl alcohol and 1 g of agar were dissolved and stirred in 100 mL of distilled water at 95° C. for 1.5 h; then the titanium dioxide and glycerol were added, and a resulting mixture was thoroughly stirred to obtain a composite solution. The mass concentration of the titanium dioxide in the composite solution was 0.03%, and the volume concentration of the glycerol in the composite solution was 3%.

Step IV: Coating on a Surface of a Fruit or Vegetable Through LBL Assembly

The temperature-sensitive inner layer solution, the deformation intermediate layer solution, and the rigid outer layer solution were spray-coated on the surface of an apple through the LBL assembly, such that three preservative film layers were successively produced on the surface of the apple, including a temperature-sensitive inner layer, a deformation intermediate layer, and a rigid outer layer from inside to outside, which could be used for the preservation of the apple. The chitosan at the end of the temperature-sensitive particle in the temperature-sensitive layer solution is a polycation, and amino in its structure is easily protonated into —$NH_3^+$, which is positively charged in the solution. The sodium alginate in the deformation intermediate layer is a polyanion, and carboxyl (—COOH) in its structure leads to a large amount of —$COO^-$, which is negatively charged in the solution. Therefore, the temperature-sensitive inner layer and the intermediate layer are connected through LBL assembly based on an electrostatic interaction between positive and negative charges. A large number of hydration hydrogen bonds are present between the gelatin and sodium alginate hydrogel in the intermediate layer and the agar (gel) polyvinyl alcohol in the outer layer, and the hydrogen bonds can improve a binding force between the two layers, such that the three layers of the preservative film can be tightly combined with each other, thereby effectively exerting the specific functions of the three layers.

Example 3

A preparation method of an antimicrobial three-layer film with temperature-controlled release under a mechanical driving power is provided, and the antimicrobial three-layer film is specifically assembled by an inner layer, an intermediate layer, and an outer layer. The inner layer is a temperature-sensitive layer and can change the resistance of a polymer for the release path of the antimicrobial active ingredient at different temperatures, which is macroscopically manifested as a release switch for the antimicrobial active ingredient. The intermediate layer is a deformation layer with the expansion and contraction property, which will expand with the rise of a temperature and directly produce an extrusion stress on the inner and outer layers. The outer layer is a rigid layer (mechanical outer layer) with excellent mechanical properties, which can not only serve as a barrier layer for the three-layer film, but also provide a centripetal driving force for the release of an active ingredient in the inner layer. In conclusion, the three-layer film can effectively control the direction and improve a power for the release path of the antimicrobial active ingredient, thereby optimizing a preservation effect. The preparation method includes the following steps.

Step I: Preparation of a Temperature-Sensitive Inner Layer Solution

S1. 3 g of chitosan was dissolved in 20 mL of a 5% acetic acid solution, then 0.6 g of a N-isopropylacrylamide monomer was added, and a resulting mixture was thoroughly stirred for thorough dissolution; a temperature of a resulting solution was adjusted to 50° ° C., 0.3 g of a solution of ceric ammonium nitrate was added as an initiator, then nitrogen was immediately introduced for protection, and a reaction was conducted for 48 h; and trichloromethane was added for precipitation to obtain a crude product, extraction was further conducted with 300 mL of methanol to obtain a fine product, and the fine product was dried in a vacuum drying oven at 40° C. to remove the residual organic solution to obtain a chitosan N-isopropylacrylamide temperature-sensitive particle.

S2. 3 g of cinnamon essential oil was completely dissolved in 10 mL of an ethanol solution with a concentration of 50% to obtain an essential oil solution for later use; 3 g of the temperature-sensitive particle prepared in S1 was dissolved in 100 mL of distilled water to obtain a temperature-sensitive particle dispersion; and then the essential oil solution was added to the temperature-sensitive particle dispersion, an adsorption reaction was fully conducted at 25° C. for 8 h, and a resulting reaction system was subjected to dialysis with distilled water for 18 h to remove the uncoated free cinnamon essential oil to obtain the temperature-sensitive inner layer solution loaded with an active ingredient.

Step II: Preparation of a Deformation Intermediate Layer Solution 2 g of gelatin and 4 g of sodium alginate were dissolved and stirred in 100 mL of distilled water at 60° C., and the nano-zinc oxide and glycerol were added to obtain a hydrogel composite solution for the intermediate layer. The mass concentration of the nano-zinc oxide in the hydrogel composite solution was 0.02%, and a volume concentration of the glycerol in the hydrogel composite solution was 2%. The nano-zinc oxide had a high thermal conductivity coefficient and exhibited prominent thermal stability and antibacterial properties, and could quickly transfer the external ambient temperature change to the inner layer in time, such that the switch of the release path of the inner layer was opened in time to reduce a resistance for the release path and quickly release the active ingredient.

Step III: Preparation of a Rigid Outer Layer Solution 4 g of polyvinyl alcohol and 2 g of agar were dissolved and stirred in 100 mL of distilled water at 100° ° C. for 1 h; and titanium dioxide and glycerol were added, and a resulting mixture was thoroughly stirred to obtain a composite solution. The mass concentration of the titanium dioxide in the composite solution was 0.05%, and a volume concentration of the glycerol in the composite solution was 4%.

Figure 4:
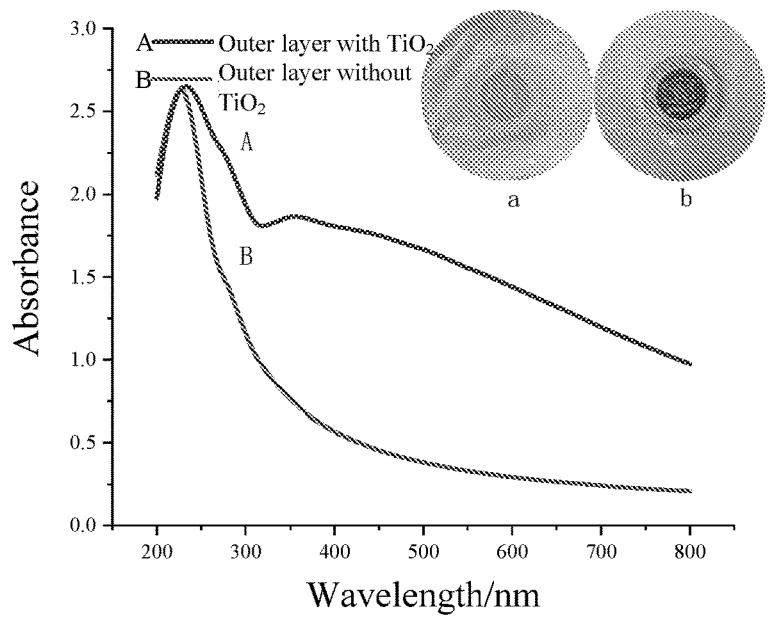
FIG. 4 shows an anti-UV barrier characteristic curve of the outer layer of the film in Example 3 of the present disclosure (A) and an anti-UV barrier curve of the film without $TiO_2$ in the comparative example (B), where inset graphs a and b are images illustrating the transmittance of the outer layers of the films in example 3 and a corresponding comparative example, respectively.

In order to further verify the UV barrier performance of $TiO_2$, an outer layer film was formed by the casting and drying method; a film without titanium dioxide was also formed as a blank comparative example, and a specific operation step was consistent with step III, except that $TiO_2$ was not added; and the UV absorption characteristics of the outer layer films with and without titanium dioxide were compared, respectively. As results shown in FIG. 4, the outer layer film with $TiO_2$ had high absorbance. It can be seen from the image of the outer layer film in FIG. 4 that the outer layer film with $TiO_2$ had low light transmittance, and there was a significant peak change in the UV region, indicating the UV barrier performance of the outer layer film.

Step IV: Coating on a Surface of a Fruit or Vegetable Through LBL Assembly

The temperature-sensitive inner layer solution, the deformation intermediate layer solution, and the rigid outer layer solution were spray-coated on the surface of a cherry tomato through the LBL assembly, such that three preservative film layers were successively produced on the surface of the cherry tomato, including a temperature-sensitive inner layer, a deformation intermediate layer, and a rigid outer layer from inside to outside, which could be used for the preservation of the cherry tomato. The chitosan at the end of the temperature-sensitive particle in the temperature-sensitive layer solution is a polycation, and amino in its structure is easily protonated into $-NH_3^+$, which is positively charged in the solution. The sodium alginate in the deformation intermediate layer is a polyanion, and carboxyl (—COOH) in its structure leads to a large amount of —COO⁻, which is negatively charged in the solution. Therefore, the temperature-sensitive inner layer and the intermediate layer are connected through LBL assembly based on an electrostatic interaction between positive and negative charges. A large number of hydration hydrogen bonds are present between the gelatin and sodium alginate hydrogel in the intermediate layer and the agar (gel) polyvinyl alcohol in the outer layer, and the hydrogen bonds can improve a binding force between the two layers, such that the three layers of the preservative film can be tightly combined with each other, thereby effectively exerting the specific functions of the three layers.

Figure 5:
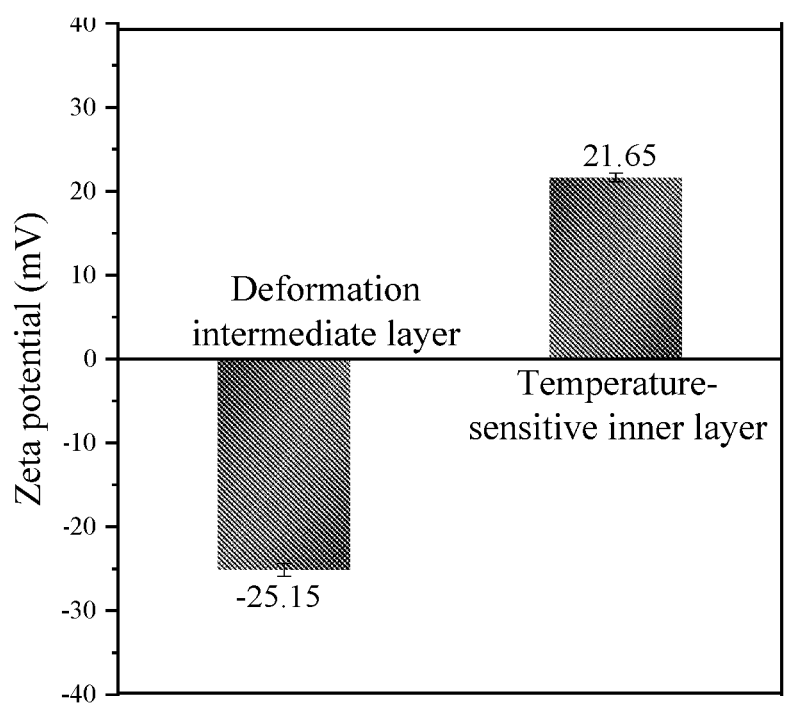
FIG. 5 shows zeta potentials of the inner layer and the outer layer of the film in example 3 of the present disclosure.

In order to further characterize the poly-electric properties of the temperature-sensitive inner layer solution and the intermediate layer solution, the zeta potentials of the two solutions each were characterized. Results are shown in FIG. 5, and it can be known that the temperature-sensitive inner layer included a chitosan polycation and thus had a positive Zeta potential value of 21.65 mV; and the deformation intermediate layer included a sodium alginate polyanion and thus had a Zeta potential of −25.15 mV which is a negative value.

Finally, the mechanical properties of film layers formed with the temperature-sensitive inner layer solution, deformation intermediate layer solution, and rigid outer layer solution by the casting and drying method were compared. With Example 3 as an example, the results in Table 1 shows that the rigid outer layer had high mechanical properties, which further proved that the rigid outer layer could resist the deformation intermediate layer to increase a mass power for the release path of the antimicrobial agent and ultimately increase the effective release rate of essential oil.

TABLE 1 mechanical properties of the three-film layers

| Film layer | Thickness (μm) | TS (MPa) | EB (%) |
| --- | --- | --- | --- |
| Rigid outer layer | 0.162 ± 0.11[b] | 48.16 ± 0.24[b] | 183.2 ± 1.38[a] |
| Deformation intermediate layer | 0.143 ± 0.06[a] | 6.43 ± 0.09[c] | 81.26 ± 1.20[b] |
| Temperature-sensitive inner layer | 0.152 ± 0.13[b] | 3.98 ± 0.03[a] | 64.58 ± 0.20[c] |

Notes:
Data with a same superscript letter in a same column indicate a statistically-significant difference ($p < 0.05$); TS represents tensile strength; and EB represents elongation at break.

Finally, it should be noted that the above examples are merely intended to illustrate the present disclosure, rather than to limit the technical solutions described in the present disclosure. Therefore, although the present disclosure is described in detail in this specification with reference to the above-mentioned examples, those of ordinary skill in the art should understand that the present disclosure can still be modified or equivalently replaced. All technical solutions and improvements thereof made without deviating from the spirit and scope of the present disclosure should be covered by the scope of the claims of the present disclosure.

What is claimed is:

1. A preparation method of a three-layer fruit or vegetable preservative film with temperature-controlled release, comprising the following steps:
   step I: preparation of a temperature-sensitive inner layer solution:
   step Ia. preparation of a temperature-sensitive particle: dissolving chitosan in an acetic acid solution, adding a N-isopropylacrylamide monomer, and thoroughly stirring; adjusting a temperature of a resulting solution to a specified value, adding a solution of ceric ammonium nitrate, then introducing nitrogen for protection, and conducting a reaction for a specified period of time; and adding an organic solvent to a mixed solution obtained after the reaction for precipitation to obtain a crude product, conducting extraction to obtain a fine product, and drying the fine product to obtain a final product, which is a chitosan N-isopropylacrylamide temperature-sensitive particle; and step Ib. preparation of the temperature-sensitive inner layer solution: dissolving an essential oil in an ethanol solution to obtain a mixed solution A; dissolving the temperature-sensitive particle prepared in the step Ia in distilled water to prepare a temperature-sensitive particle dispersion with a specified mass concentration; and adding the mixed solution A to the temperature-sensitive particle dispersion to obtain a mixed solution B, conducting a reaction at a specified temperature, and subjecting the mixed solution B to dialysis with distilled water to obtain a temperature-sensitive inner layer solution loaded with an active ingredient;

step II: preparation of a deformation intermediate layer solution:

dissolving gelatin and sodium alginate in distilled water, thoroughly stirring at a specified temperature, and adding nano-zinc oxide and glycerol to obtain a hydrogel composite solution, which is the deformation intermediate layer solution;

step III: preparation of a rigid outer layer solution:

dissolving polyvinyl alcohol and agar in distilled water, heating and stirring to a specified temperature; and adding nano-titanium dioxide and glycerol, and thoroughly stirring to obtain a composite solution, which is the rigid outer layer solution; and step IV: coating on a surface of a fruit or vegetable through layer-by-layer assembly:

spray-coating the temperature-sensitive inner layer solution, the deformation intermediate layer solution, and the rigid outer layer solution on the surface of the fruit or vegetable through the layer-by-layer assembly, such that three preservative film layers are successively produced to obtain the three-layer fruit or vegetable preservative film with temperature-controlled release.

2. The preparation method of the three-layer fruit or vegetable preservative film with temperature-controlled release according to claim 1, wherein in the step Ia, the chitosan, the N-isopropylacrylamide monomer, the ceric ammonium nitrate, and the acetic acid solution are in a ratio of (5-10) g:(5-2) g:1 g:(20-50) mL; the acetic acid solution has a volume concentration of 2% to 5%; the temperature is adjusted to 40° C. to 50° C.; and the reaction is conducted for 24 h to 48 h.

3. The preparation method of the three-layer fruit or vegetable preservative film with temperature-controlled release according to claim 1, wherein in the step Ia, the organic solvent is any one selected from, or a composite solution of any two or more at any ratio selected from the group consisting of acetone, dichloromethane, trichloromethane, N,N-dimethylacetamide, ethyl acetate, and dihydrofuran; the mixed solution and the organic solvent are in a volume ratio of 1:(5-15); and the drying is conducted at 25° C. to 40° C.

4. The preparation method of the three-layer fruit or vegetable preservative film with temperature-controlled release under the mechanical driving power according to claim 1, wherein in the step Ib, the essential oil is any one selected from the group consisting of oregano essential oil, cinnamon essential oil, Eucalyptus essential oil, clove essential oil, and thyme essential oil; the ethanol solution has a volume concentration of 50%; and a mass concentration of the essential oil in the mixed solution A is 1.5% to 3%.

5. The preparation method of the three-layer fruit or vegetable preservative film with temperature-controlled release under the mechanical driving power according to claim 1, wherein in the step Ib, the temperature-sensitive particle dispersion has a mass concentration of 1 g/mL to 3 g/mL; the mixed solution A is added to the temperature-sensitive particle dispersion in a volume ratio of 1:(5-10); the reaction is conducted at 18° C. to 25° C. for 6 h to 8 h; and the dialysis is conducted for 6 h to 18 h.

6. The preparation method of the three-layer fruit or vegetable preservative film with temperature-controlled release under the mechanical driving power according to claim 1, wherein in the step II, the gelatin, the sodium alginate, and the distilled water are in a ratio of (1-2) g:(2-4) g:100 mL; the stirring is conducted at 40° C. to 60° C.; a mass concentration of the nano-zinc oxide in the hydrogel composite solution is 0.01% to 0.03%; and a volume concentration of the glycerol in the hydrogel composite solution is 1% to 2%.

7. The preparation method of the three-layer fruit or vegetable preservative film with temperature-controlled release under the mechanical driving power according to claim 1, wherein in the step III, the polyvinyl alcohol, the agar, and the distilled water are in a ratio of (2-4) g:(0.5-2) g:100 mL; the heating is conducted to 90° C. to 100° C., and the stirring is conducted for 1 h to 2 h; a mass concentration of the nano-titanium dioxide in the composite solution is 0.01% to 0.05%; and a volume concentration of the glycerol in the composite solution is 1% to 4%.

8. The preparation method of the three-layer fruit or vegetable preservative film with temperature-controlled release under the mechanical driving power according to claim 1, wherein in the step IV, the fruit or vegetable is specifically a spherical fruit or vegetable, comprising apple, citrus, peach, cherry tomato, tomato, round pear, or round eggplant.

\* \* \* \* \*